United States Patent
Bauer et al.

(10) Patent No.: US 10,615,962 B2
(45) Date of Patent: Apr. 7, 2020

(54) ALTERNATIVE REPRESENTATION OF THE CRYPTO-ALGORITHM DES

(71) Applicant: GIESECKE+DEVRIENT MOBILE SECURITY GMBH, München (DE)

(72) Inventors: Sven Bauer, Vaterstetten (DE); Hermann Drexler, München (DE); Jürgen Pulkus, München (DE)

(73) Assignee: GIESECKE+DEVRIENT MOBILE SECURITY GMBH, München (DE)

( * ) Notice: Subject to any disclaimer, the term of this patent is extended or adjusted under 35 U.S.C. 154(b) by 83 days.

(21) Appl. No.: 15/771,157

(22) PCT Filed: Oct. 28, 2016

(86) PCT No.: PCT/EP2016/001807
§ 371 (c)(1),
(2) Date: Apr. 26, 2018

(87) PCT Pub. No.: WO2017/071814
PCT Pub. Date: May 4, 2017

(65) Prior Publication Data
US 2018/0309568 A1 Oct. 25, 2018

(30) Foreign Application Priority Data
Oct. 30, 2015 (DE) .......................... 10 2015 014 038

(51) Int. Cl.
*H04L 9/06* (2006.01)
*H04L 9/00* (2006.01)
(52) U.S. Cl.
CPC ............ *H04L 9/0625* (2013.01); *H04L 9/002* (2013.01); *H04L 2209/16* (2013.01)
(58) Field of Classification Search
CPC .... H04L 9/0625; H04L 9/002; H04L 2209/16
(Continued)

(56) References Cited

U.S. PATENT DOCUMENTS

| | | | | |
|---|---|---|---|---|
| 8,479,016 B2* | 7/2013 | Michiels | ................. | H04L 9/002 713/189 |
| 2004/0139340 A1* | 7/2004 | Johnson | .................. | G06F 21/14 713/194 |

(Continued)

FOREIGN PATENT DOCUMENTS

DE      102014016548 A1     5/2016

OTHER PUBLICATIONS

Link et al—U.S. Appl. No. 15/771,157 (Year: 2011).*

(Continued)

*Primary Examiner* — Taghi T Arani
*Assistant Examiner* — Badri Champakesan
(74) *Attorney, Agent, or Firm* — Workman Nydegger

(57) ABSTRACT

A processor device has an executable implementation of the cryptographic algorithm DES implemented with an XOR linkage operation at the round exit and an implemented computation step S arranged to map expanded right input values r' as computation step entry values x=r' onto exit values s=S[x]. The computation step S is implemented as a key-dependent computation step further comprises a key linkage operation for linking input values of the round with key values of the round derived directly or indirectly from the key. The computation step S is implemented as a combined key-dependent computation step T which further comprises: a permutation operation P associated with the round, arranged to be applied to exit values s of the computation step S and to supply the exit values s of the computation step in permutated form to the XOR linkage operation at the round exit.

20 Claims, 2 Drawing Sheets

(58) Field of Classification Search
USPC .......................................................... 713/189
See application file for complete search history.

(56) References Cited

U.S. PATENT DOCUMENTS

| | | | | |
|---|---|---|---|---|
| 2012/0121083 | A1* | 5/2012 | You ....................... | H04L 9/0631 380/28 |
| 2015/0163054 | A1* | 6/2015 | Roelse ..................... | H04L 9/06 380/278 |
| 2015/0270949 | A1* | 9/2015 | Michiels ................... | H04L 9/14 380/28 |
| 2015/0312225 | A1* | 10/2015 | Michiels ............. | H04L 63/0428 713/168 |
| 2016/0182227 | A1* | 6/2016 | Michiels .............. | H04L 9/0838 380/28 |
| 2017/0324542 | A1* | 11/2017 | Drexler .................... | G09C 1/06 |
| 2017/0324543 | A1 | 11/2017 | Drexler et al. | |
| 2017/0324547 | A1 | 11/2017 | Drexler et al. | |
| 2017/0352298 | A1* | 12/2017 | Drexler ................ | H04L 9/0618 |

OTHER PUBLICATIONS

Muir, "A Tutorial on White-Box AES," Advances in Network Analysis and its Applications, Feb. 22, 2013, 25 Pages.
Chow et al., "A White-Box DES Implementation for DRM Application," Pre-Conf-Record fro ACM DRM-2 Workshop, Oct. 10, 2002, 16 Pages.
Bos et al., "Differential Computation Analysis: Hiding your White-Box Designs is Not Enough," Retrieved from, eprint. iacr.org/2015/753, Retrieved on Jul. 31, 2015, 22 Pages.
Mulder, "White-Box Cryptography Analysis of White-Box AES Implementations," Ku Leuven, Feb. 2014, 256 Pages.
Link et al., "Clarifying Obfuscation: Improving the Security of White-Box Encoding," International Association for Cryptologic Research, Jan. 2004, 11 Pages.
Matsunaga et al., "Security Evaluation of a Type of Table-Network Implementation of Block Ciphers," Advances in Computer Science, Dec. 6, 2006, 12 Pages.
International Search Report from PCT Application No. PCT/EP2016/001807, dated Feb. 3, 2017.
German Search Report from DE Application No. DE 102015014038.8, dated Apr. 13, 2017.

* cited by examiner

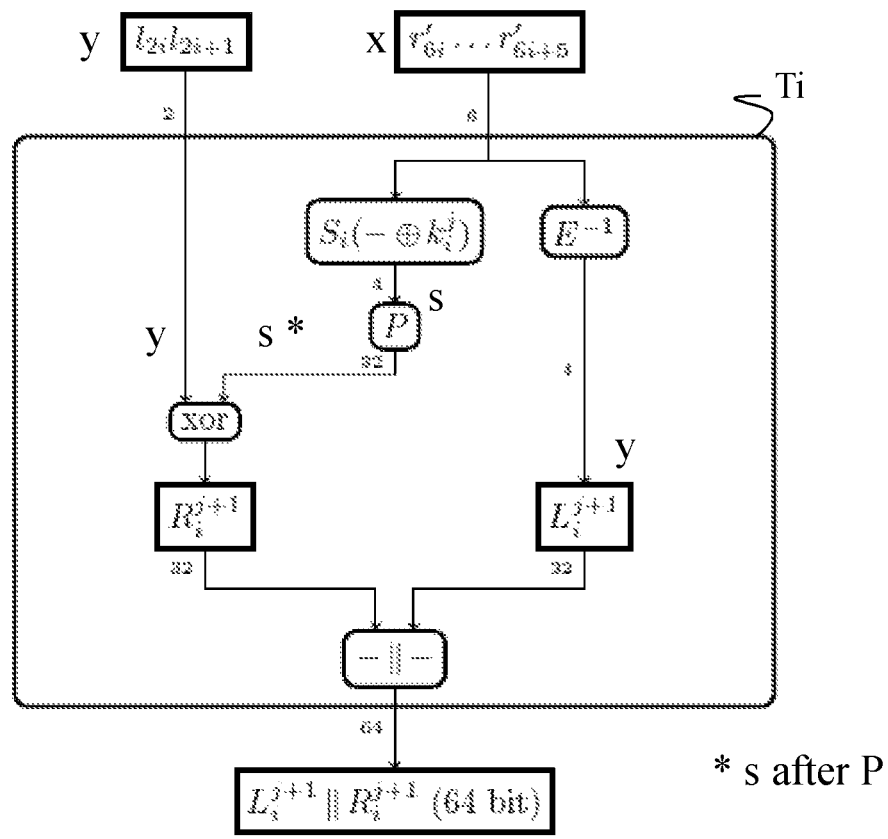

Fig. 3

Multiplication of the matrix of the linear mapping $A$ with a data vector:

$$a = A(s, y) \qquad A = MA \qquad (s, y) = (S(x), y)$$

$$\begin{pmatrix} a_0 \\ \vdots \\ a_{l-1} \end{pmatrix} = \begin{pmatrix} a_{0,0} & \cdots & a_{0,n-1} \\ \vdots & & \vdots \\ a_{l-1,0} & \cdots & a_{l-1,n-1} \end{pmatrix} \underbrace{\begin{pmatrix} a_{0,n} & \cdots & a_{0,n+m-1} \\ \vdots & & \vdots \\ a_{l-1,n} & \cdots & a_{l-1,n+m-1} \end{pmatrix}}_{\text{Columns with coefficients of } y_j} \cdot \begin{pmatrix} s_0 \\ \vdots \\ s_{m-1} \\ y_0 \\ \vdots \\ y_{m-1} \end{pmatrix}$$

Columns with coefficients of $s_j$.   Columns with coefficients of $y_j$.

Each $a_i$ is a linear combination of $s_j$ and $y_j$ $$a_i = \sum_{j=0}^{n-1} a_{i,j} s_j + \sum_{j=0}^{m-1} a_{i,n+j} y_j$$

Fig. 4

ALTERNATIVE REPRESENTATION OF THE CRYPTO-ALGORITHM DES

FIELD OF THE INVENTION

The invention relates to a processor device with an implementation of the cryptographic algorithm DES. The invention relates in particular to the technical field of protecting the DES against attacks by means of white-box cryptography and to an implementation of DES in a representation which is adjusted to white-box cryptography.

BACKGROUND OF THE INVENTION

A processor device for the purposes of the invention is understood to be a unit or another object having a processor, for example, a mobile end unit, such as e.g. a smartphone. Security-critical data used by the cryptographic algorithm, e.g. pins, passwords, cryptographic keys etc. are supplied in secured fashion to the processor device. Traditionally, security-critical data are secured by (grey-box) cryptography to protect them against an attack by unauthorized persons. For this purpose, the data are supplied on a security element of the mobile end unit, which is independent in terms of hardware, for example, on a SIM card removable from the mobile end unit.

An alternative approach which is applicable in particular also to mobile end units having no independent security element is based on the white-box cryptography. In a white-box implementation of a cryptographic algorithm it is attempted to hide the security-critical data, in particular secret cryptographic keys, in the implementation in such a way that an attacker having full access to the implementation is not capable of extracting the security-critical data from the implementation. A white-box implementation of the AES crypto-algorithm (AES=Advanced Encryption Standard) is known, for example, from the publication [1] "A Tutorial on White-box AES" from James A. Muir, Cryptology ePrint Archives, Report 2013/104. Likewise, white-box implementations of cryptographic algorithms or routines are commercially distributed.

An ideal white-box implementation of a crypto-algorithm conceals security-critical data such as cryptographic keys such that they are not ascertainable by an attack.

In the patent application DE 102014016548.5 of the applicant of the present application there is described a method for testing a white-box implementation of a cryptographic algorithm executable on a processor, with which the inventors have succeeded in ascertaining security-critical data by an attack, which actually should not be possible according to the concept of the white box. Under this aspect, the tested white-box implementations are by definition no longer perfect white-box due to their attackability, yet are hereinafter still designated as white-box implementations due to their objective of being perfect.

In the technical publication [3] "Differential Computation Analysis: Hiding your White-Box Designs is Not Enough", J. W. Bos, Ch. Hubain, W. Michiels, and Ph. Teuwen, eprint.iacr.org/2015/753, by the company NXP, there is disclosed a similar test method like in the above-mentioned patent application 102014016548.5, with which the secret key could likewise be ascertained from a white-box implementation of a crypto-algorithm with statistical methods.

In the patent application 102014016548.5, further, a directive for action is supplied for a method for hardening the white-box implementation of a cryptographic algorithm executable on a processor. To achieve the hardening, the white-box implementation is here configured such that upon generating the cipher text at least one lookup table comes into use to statically map entry values of the lookup table onto exit values of the lookup table. The method comprises the step that the lookup table is statistically permutated such that the individual bits of the permutated lookup table substantially do not correlate with the bits of the lookup table. In other words: the lookup table T is statistically permutated by means of an inverted mapping f (there designated as permutation P) such that the individual bits of the permutated lookup table T'(x)=f(T(x)) do not correlate with the bits T(x) for randomly varying input x.

The inventors of the present application have developed three construction regulations for a function f, which function f allows a cryptographic algorithm, in particular a block cipher like the Data Encryption Standard (or also AES), to be white-box-masked in such a way that the attack described in the patent application 102014016548.5 is prevented or at least made very difficult. The basic principle here is to link exit values of security-critical computation steps with values/bits statistically independent thereof, so-called obfuscation values/bits y. Statistically independently means here that with a randomly varying entry value x the exit values of the computation step S[x] do not or only slightly correlate with the obfuscation values/bits. These construction regulations are described in separate applications. The construction regulations were first developed on the basis of the standard representation of crypto-algorithms, in particular of the Data Encryption Standard DES, and turned out to be memory-intensive and complicated to realize. There has thus been a desire to find an easier possibility to apply the developed construction regulations for the function f to crypto-algorithms, in particular to block ciphers, in particular the DES.

The invention is based on the object of stating a processor device having an implementation of the cryptographic algorithm DES, which allows a masking against attacks by means of white-box cryptography in an easier way than conventional standard implementations.

In the document [4] "A White-Box DES Implementation for DRM Applications", S. Chow, P. Eisen, H. Johnson, P. C. van Oorschot, pre-proceedings for ACM DRM-2002, Oct. 15, in 2002, the authors have already found that a white-box implementation of the DES is demanding (e.g., [4] page 2, para. 5) and developed an alternative representation of the DES which allows an easier further development to a white-box implementation. Document [4] first starts out from a DES having 16 rounds. Each DES round of DES in standard representation (regarding DES round in standard representation see also FIG. 1 of the present application) has eight S-box operations S1, . . . S8, with an expansion operation E and a linkage (XOR) with key bits before the S-box operations and a permutation operation P after the S-box operations. For the subsequent round, input bits of the right side R are supplied, without going through S-boxes, as input bits of the left side to the subsequent DES round. According to [4], chapt. 5, the operations of two successive DES rounds are combined and newly grouped in a cross-DES-round manner. In doing so, the eight S-box operations S1, . . . S8 provided in DES in standard representation are replaced by twelve T-box operations ([4] chapt. 5.1). In eight of the T-box operations, besides the S-box operations, there additionally enter linkages with key bits at the input of the S-boxes. Four further T-boxes are supplied for receiving the input bits that are to be delivered merely to the next round (in [4] sometimes designated as dummy T-boxes). Between the T-box operations T, the M-box operations are carried out in which the permutation operation P of a round and the expansion operation E of the following round are absorbed ([4] FIG. 1 (a) and (b)). Inter alia for reasons of the total of twelve T-boxes required and the additional M-box operation, the white-box implementation stated in [4] is memory-intensive. The partial break-up of the round structure of the DES, because in the M-boxes there are included operations of two different rounds, also has the potential of incompatibility or requires at least increased care and attention.

SUMMARY OF THE INVENTION

The object is achieved by a processor device according to claim 1. Embodiments of the invention are stated in the dependent claims.

The processor device according to claim 1 is equipped with an executable implementation of the cryptographic algorithm DES comprising several rounds, said implementation being implemented thereon. The DES is arranged to generate, using a secret key K from an entry text, an exit text. The implementation comprises in at least one or in each round optionally with the exception of a first or/and last round of the algorithm configured partly in a deviating manner:

reception means for right r and left input values l of the round;

an expansion operation E arranged to expand at least some of the right input values r into expanded right input values r';

an implemented computation step S (e.g. S-box) arranged to map expanded right input values r' as computation step entry values x=r' onto exit values s=S[x];

a XOR linkage operation at the round exit, arranged to link exit values s of the computation step S of the round with left input values l of the round and to supply these to the subsequent round.

Further, the computation step S is implemented as a key-dependent computation step which in addition to the computation step S further comprises a key linkage operation for linking input values of the round with key values of the round derived directly or indirectly from the key. A key-dependent computation step in a representation of the algorithm DES is known in particular from document [4].

The processor device is characterized in that the computation step S is implemented, more precisely, as a combined key-dependent computation step T which further comprises a permutation operation P associated with the round which is arranged to be applied to exit values s of the computation step S and to supply the exit values s of the computation step in permutated form to the XOR linkage operation occurring in the DES algorithm at the round exit.

In the combined key-dependent computation step T there are thus combined the DES-specific (non-linear) computation step, in particular the DES-box operation, the linkage of key values (e.g. key bits) with entry values (e.g. right bits of the DES round input), and the permutation at the DES round output in one single computation step T, i.e. one single T-box operation.

Since the combined computation step T (T-box) includes a linkage of key values with entry values, by applying a masking function f to the exit values of the combined computation step T (T-Box) there would be achieved a "white-box" masking which hides the key, which is desired for white-box cryptography. By integrating the key linkage step in the combined computation step (T-Box) there is thus performed a first preparatory step for a simple white-box masking. Since in the combined computation step T there is also included the permutation P, by the combined computation step T (T-Box), further, the exit values s of the computation step S are supplied already in permutated form, as required before the XOR operation at the DES round end. If for the white-box masking of the implementation of the DES now a masking of the computation step S (e.g. S-box) is to be carried out by means of the masking function f, the masking function f only needs to be applied to the exit values t of the combined key-dependent computation step T.

Consequently, according to claim 1, a processor device with a DES implementation is created, which can be white-box masked in a simple fashion.

The cryptographic algorithm DES is arranged selectively in the encryption or decryption mode (encrypt/decrypt mode).

Selectively, the combined key-dependent computation step T further comprises an inverse expansion operation $E^{-1}$ associated with the round, which is arranged to be applied to at least some of the expanded right input values r' in particular for undoing the expansion operation and for supplying the non-expanded right entry values r as left entry values l for the subsequent round. The mapping of the expanded right entry values r' by the computation step S within the round remains unaffected by the inverse expansion operation $E^{-1}$, i.e. the expanded right entry values (e.g. bits) r' are still fed to the computation step S (e.g. S-box).

The right entry values (e.g. bits) now present in non-expanded form within the DES round can be used, when the implementation is white-box-masked with a masking function f, as obfuscation values y as needed. Compared to the standard DES implementation, the implementation introduced here has the advantage that the right entry values present in non-expanded form are automatically available within the combined computation step T (T-Box) and do not have to be fed in a separate table or the like.

Selectively, the combined key-dependent computation step T is formed by ten T-box operations, wherein in eight of the T-box operations:

a) six bits $r'_{6i}, \ldots r'_{6i+5}$ are processed by right bits r', which were expanded by the expansion operation E, by an S-box operation into four bits of S-box exit values s;

b) six bits $r'_{6i}, \ldots r'_{6i+5}$ are processed by right bits r', which were expanded by the expansion operation E, by the inverse expansion operation $E^{-1}$ into four bits of left bits l of the subsequent round; and c) two bits $l_{2i}, l_{2i+1}$ of left bits are supplied as an input for the subsequent XOR operation;

and in the remaining two T-box operations eight bits of left bits are supplied as an input for the subsequent XOR operation.

Selectively, in each T-box operation eight entry bits are processed into 64 exit bits.

Selectively, the implementation comprises in at least one or in each round—optionally with the exception of a first or/and last round of the algorithm configured partly in a deviating manner:

(i) an invertible mapping B occupied with random values, which is to be applied to left input values l of the round according to Bl, or two invertible mappings B and C occupied with random values, which are to be applied to left l and right input values r of the round according to Bl+Cr;

(ii) the left input values l of the round are replaced by Bl or Bl+Cr; and the combined key-dependent computation step T further comprises:

(iii) corresponding to (i) one or two inverse invertible mapping/s $B^{-1}$ or $B^{-1}$ and $C^{-1}$ occupied with random values, with which the invertible mapping/s B or B and C is/are undone.

By the mapping B a further obfuscation is generated. When using the two mappings B and C there is additionally achieved a mixing of left and right entry values, which increases the confusion. By the intermixture it is further achieved that possible, perhaps still remaining smaller statistical dependencies on entry values l and r are further reduced with exit values of the computation step S[x].

Selectively, the implementation, preferably the combined key-dependent computation step T of the round, additionally comprises a further invertible function g to be applied according to $g^{-1}(x)$ or $g^{-1}(x, y)$ to entry values x of the computation step S or to entry values x of the computation step S and to left or/and right entry values l, r of the round supplied as obfuscation values y.

Here, preferably $g^{-1}(x)$ is equal to the inverse function of a function g(x) which has been applied to exit values of the preceding round which directly precedes the round. This achieves that the masking of the output of a round is automatically eliminated in the input of the subsequent round.

The processor device selectively further comprises an implemented masking operation V which is arranged to mask exit values t of combined key-dependent computation steps T, which are dependent on the same right entry value r'i, are linked with masking values v(r'i) dependent on these right entry values r'i by means of the masking operation V, in particular are bit-wisely XORed according to t XOR v(r'i).

An example of claim 8 is as follows. The computation step S be the multiplicity of the eight S-box operations S1, ... S8 of a DES round. Into the S-box callings S1 and S8 there enters, for example, respectively the same right bit r0. Now, the corresponding outputs of the T-boxes T1 and T8 are XORed with masks V0 (r0=0) and V1 (r0=1). The outputs which are achieved when the bit is r0=0 are masked with V0, the outputs achieved with bit r0=1 are masked with V1. Upon the subsequent XOR operation of all T-boxes the maskings are then automatically omitted.

Selectively, the combined key-dependent computation step T is masked, by means of an invertible function f, into a white-box-masked combined key-dependent computation step T', according to T'=f*T.

Selectively, the invertible function f comprises an affine mapping A applied to the computation step S, in particular a linear mapping, in particular a matrix MA, the affine mapping A being arranged to generate exit values a from A, by A being applied to exit values s of the computation step S and, in addition, to right or/and left input values r, l of the round supplied as obfuscation values y, so that it holds that a=A(S[x], y)=A(s, y), and, altogether, by the invertible function f exit values a=f(s,y) or w=f(s,y) being generated.

As a mapping f there is selectively further provided a combination (f=(c1, c2, ... )*A) of an affine, preferably linear, mapping A with an input width BA and a number of one or several invertible, preferably non-linear, mappings c1, c2, ... with each having an input width Bc1, Bc2, ..., where BA=Bc1+Bc2+ ..., exit values w being generated by the mapping f. Such a decomposition of the function f has the advantage, especially in the case of several invertible mappings c1, c2, ..., that each individual mapping ci, i=1, 2, ... has a narrower input width than the entire function f and the affine function and thus is easier to handle.

Affine, in particular linear, operations in white-box implementations which are carried out with arbitrary invertible, in particular non-linear, obfuscated computation steps are often realized by means of table calls. The table size and thus also the memory requirement of the white-box implementation is determined by the input width of the arbitrary invertible, in particular non-linear, mappings. Therefore, it is advantageous to decompose the function f into an affine, in particular linear, mapping A and several invertible, in particular non-linear, mappings ci, i=1, 2, .... The several, e.g. a number n, arbitrary invertible or non-linear mappings have an input width of only 1/n of the input width of the affine or linear mapping A. The number of the different elements to which the ci, i=1, 2, ... are applied, is 2 ^input width. Thus, the memory requirement is drastically reduced by the decomposition. The above consideration regarding the input width of tables, for clarity's sake, was made with the help of tables, but also holds in analogous manner for the input widths of differently represented mappings. Thus, through the decomposition according to step a) the function f has been made easier to handle for the white-box masking.

The processor device is selectively equipped with a triple DES. For this purpose, the processor device comprises a triple DES implementation which is composed of three implementations configured as described hereinabove.

In a processor device white-box-masked with invertible functions f, for those of the three implementations of DES within the triple DES for which the same round keys are used the same white-box-masked combined key-dependent computation steps T' are selectively used. In some cases, with triple DES, the same round keys are used in particular for the first and the third DES. In this case, in this variant, for the first and the third DES the same white-box-masked combined key-dependent computation steps T' are used.

Selectively, in a processor device white-box-masked with invertible functions f, there are used the same functions f for those of the three implementations of DES within the triple DES for which the same round keys are used, in particular selectively for the first and the third DES, analogous to the procedure with the T' boxes.

BRIEF DESCRIPTION OF THE DRAWINGS

Hereinafter the invention will be explained more closely on the basis of embodiment examples and with reference to the drawings, in which are shown:

FIG. 3 a detailed representation of a single operation T in the DES round of FIG. 2;

FIG. 4 a white-box masking of a DES round according to FIG. 2 and FIG. 3, according to embodiments of the invention.

DETAILED DESCRIPTION OF EMBODIMENT EXAMPLES

Figure 1:
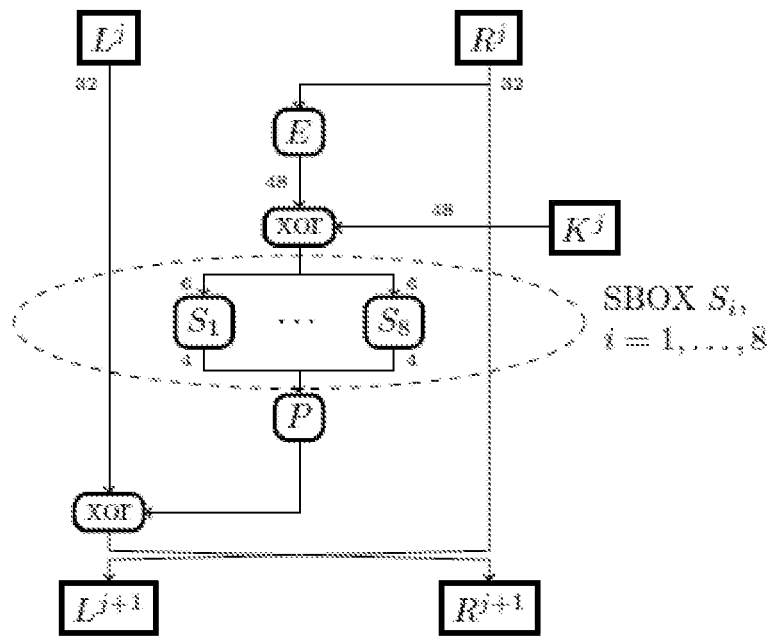
FIG. 1 a DES round in standard representation, according to the prior art, suitable as a basis of the invention.

FIG. 1 shows a DES round according to the prior art. At the input of a DES round, 64 bits of input data are split into 32 bits left side L=lj, j=0, ..., 31 and 32 bits right side R=rj, j=0, ... 31. The bits of the right side R are expanded by means of an expansion operation to 48 bits of expanded input data E=r'j, j=0, ... 47 of the right side. The 48 bits expanded input data E are linked with 48 bits of key data K=kj, j=0, ... 47, by means of an XOR operation, into entry values xj=r'j XOR kj, j=0, ... 47 for eight S-boxes S. Each of the eight S-boxes S=S1, ... S8 processes six bits of entry values xj into respectively four bits of exit values sj. The four-bit-wide exit values sj of the eight S-boxes S=S1, ... S8 are fed to a permutation operation P, and the exit values of the permutation P are XORed with bits of the left side and fed to the next DES round. In the standard DES implementation the DES round ends here.

In the following, with reference to FIG. 2 and FIG. 3 an alternative representation of a DES round is set forth, in which the operations specific for a DES round S-box operation S and permutation P are combined into a combined operation T. In so doing, the white-box masking with the mapping A, or specifically with the matrix MA, is applied to the combined operation T in which the S-box operation is included (see FIG. 4).

Figure 2:
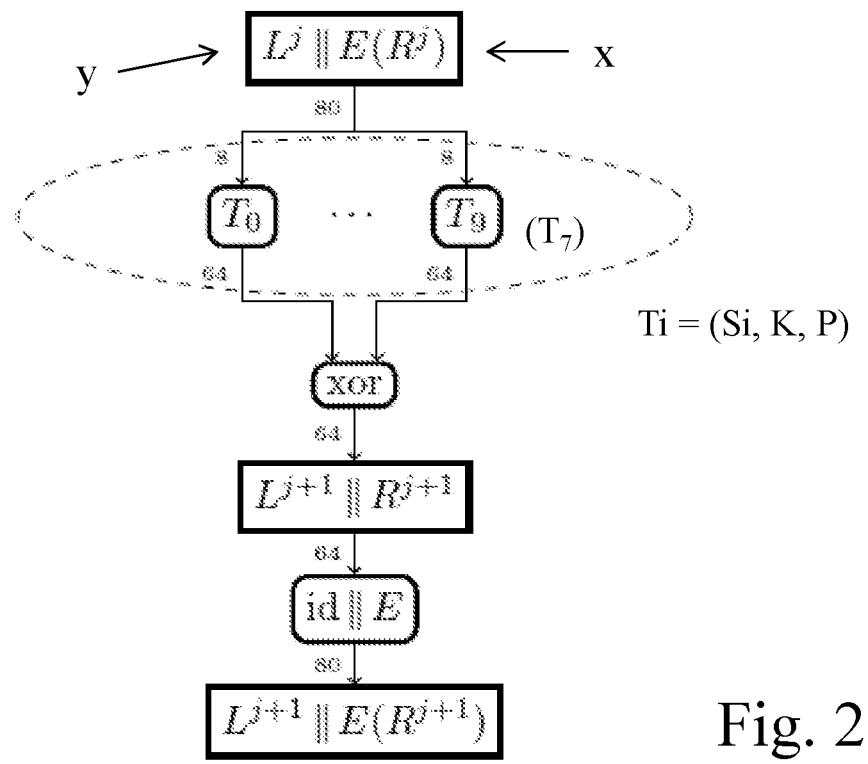
FIG. 2 a DES round in an alternative representation, with S-box operations S embedded in operations T, according to an embodiment of the invention.

FIG. 2 shows a DES round in an alternative representation, especially suitable for the application of a white-box masking according to the invention. At the input of the DES round, first, as according to FIG. 1, 64 bits of input data are split into 32 bits left side L=lj, j=0, ..., 31 and 32 bits right side R=rj, j=0, ... 31 and the bits of the right side are expanded to 48 bits E(Rj). In the alternative representation of FIG. 2, two or more bits from the 32 bits L=lj, j=0, ..., 31 of the left side of the round input data are used as obfuscation width y. As a result, upon execution of the DES round, the DES-specific eight S-box operations are executed in that a plurality of eight or ten combined operations T=T0, ... T7 or T0, ... T9 is carried out, in which the S-box operations S=S1, ... S8 are also comprised.

FIG. 3 shows the detailed structure of one single combined operation T=Ti, i=0 ... 7 (or, where applicable, 0, ... 9) of FIG. 2. (Optionally, an additionally present padding with zero-bits and shifts is omitted in FIG. 3 for clarity's sake.) In contrast to the S-boxes S of the DES representation of FIG. 1, in the combined operations T=Ti of FIG. 2 and FIG. 3 the key kj and the DES-typical permutation P are already taken account of in the operation T. The S-box with the key kj taken account of is represented in FIG. 3 by the operation box Si(-XORkij), the permutation by P. Further, before the computation step S, i.e. before the S-box operations S1, ... 8, there are generated eight (or ten) overall tables T0, ... T7 (or T0, ... T9) in which there are respectively included six bits of input values xj=rj, j=0, ... 47 (gained from expanded bits r'j of the right side; not XORed with K, because the key bits kj are already included in S) for the eight S-boxes S and two bits lj, j=0, ..., 31 of the left side of the round input values, and in ten overall tables Ti there are included further bits of the left side lj, j=0, ..., 31 of the round. The two (or more) bits of the left side lj of the round are not processed by the S-boxes here. Each six bits of input values xj=rj XOR kj are processed by one S-box each. Thus, the overall tables Ti deliver exit values which include both output values sj of the S-boxes and bits of the left side lj of the round.

As represented in FIG. 4, the white-box masking of the implementation is carried out by the exit values of the combined operations Ti being fed to the matrix MA of the invention, by which the affine mapping A of the invention is represented. The vector on the right includes useful data, namely exit values si of S-box operations, as well as obfuscation values y, for example left bits 1 or right bits r of the round input values x which were not processed by S-boxes. In so doing, both the input values x, i.e. the bits rj of the right side, as well as the statistically independent values y, i.e. the bits lj of the left side of the DES round input value used as obfuscation values lj, are fed to the matrix MA. It is not required here to separately get the statistically independent values y=lj, because they are already included in the combined operation T. For this reason, the DES representation of FIG. 2 is especially well suited for implementing the invention. The result of the masking are white-box masked operations Ti', i=0, ... 9 or i=0, ... 7. These white-box-masked operations Ti' are implemented in the processor device.

In the embodiment of FIG. 4, the affine mapping A included in the mapping f used for the white-box masking is configured as a matrix MA, with coefficients aij, i=0, ... l−1, j=0, ... n+m−1.

The matrix MA is multiplied by the input vector (s,y) which includes S-box output values s=S[x] (e.g. bits r of the right side) and obfuscation values y (e.g. bits of the left side, where applicable additionally bits r of the right side) to generate an output vector a. The summation formula in FIG. 4 illustrates this state of affairs for a single line ai of the matrix MA and a herewith generated single entry αi of the output vector a. In the input vector (s,y) there are included in the upper n entries the S-box output values s and in the lower m entries the obfuscation values y (left bits l, where applicable also right bits r). In the matrix MA there are included accordingly on the left the n coefficients aij, j=0, ... n−1 of MA to be multiplied with the S-box output values s=s0, ... s n−1. On the right in the matrix MA there are included the m coefficients aij, j=n, ... n+m−1 of MA to be multiplied with the obfuscation values y=y0, ... ym−1.

GLOSSARY

S: computation step, in particular DES SBOX
T: combined operation comprising computation step S
T': white-box obfuscated combined operation T
x: entry value in computation step S
y: obfuscation value
r: right side of the entry of a round
r': expanded right side of the entry of a round
l: left side of the entry of a round
s: exit value of the computation step S (e.g. S-box)

CITED PRIOR ART

[1] "A tutorial on White-box AES", James A. Muir, Cryptology ePrint Archive, Report in 2013/104, eprint.iacr.org/2013/104
[2] DE 102014016548.5 (filed on 10 Nov. 2014)
[3] "Differential Computation Analysis: Hiding your White-Box Designs is Not Enough", J. W. Bos, Ch. Hubain, W. Michiels, and Ph. Teuwen, eprint.iacr.org/2015/753, retrieved on 31 Jul. 2015
[4] "A White-Box DES Implementation for DRM Applications", S. Chow, P. Eisen, H. Johnson, P. C. van Oorschot, pre-proceedings for ACM DRM-2002, Oct. 15, 2002, https://crypto.stanford.edu/DRM2002/whitebox.pdf

The invention claimed is:
1. A processor device comprising a memory having an executable implementation of a cryptographic algorithm DES comprising several rounds implemented thereon, wherein the implementation comprises in at least a round of the several rounds implemented thereon:
a reception of right input values r and left input values l of the round;

an expansion operation E arranged to expand at least some of the right input values r into expanded right input values r';

an implemented computation step S arranged to map the expanded right input values r' as computation step entry values x=r' onto exit values s=S[x];

a XOR linkage operation at an exit of the round, arranged to link exit values s of the computation step S of the round with the left input values l of the round and to supply the linked exit values to the subsequent round;

wherein the computation step S is implemented as a key-dependent computation step which in addition to the computation step S further comprises a key linkage operation for linking input values of the round with key values of the round derived from the key;

wherein:

the computation step S is implemented as a combined key-dependent computation step T which further comprises:

a permutation operation P associated with the round, arranged to be applied to exit values s of the computation step S and to supply the exit values s of the computation step in permutated form to the XOR linkage operation at the exit of the round, wherein the processor device further comprises an implemented masking operation V arranged to mask exit values t of combined key-dependent computation steps T, which are dependent on the same right entry value r'i, are linked with masking values v(r'i) dependent on these right entry values r'i by the masking operation V.

2. The processor device according to claim 1, wherein the combined key-dependent computation step T further comprises:

an inverse expansion operation $E^{-1}$ associated with the round, arranged to be applied to at least some of the expanded right input values r' for undoing the expansion operation E and for supplying non-expanded right entry values r as left entry values l for the subsequent round, wherein the mapping of the expanded right entry values r' by the computation step S within the round remains unaffected by the inverse expansion operation $E^{-1}$.

3. The processor device according to claim 2, wherein the combined key-dependent computation step T is formed by ten T-box operations, wherein in eight of the T-box operations:

a) six bits $r'_{6i}, \ldots r'_{6i+5}$ are processed by right bits r', which were expanded by the expansion operation E, by an S-box operation into four bits of S-box exit values s;

b) six bits $r'_{6i}, \ldots r'_{6i+5}$ are processed by right bits r', which were expanded by the expansion operation E, by the inverse expansion operation $E^{-1}$ into four bits of left bits l of the subsequent round; and c) two bits $l_{2i}, l_{2i+1}$ of left bits are supplied as an input for the subsequent XOR operation;

and in the remaining two T-box operations eight bits of left bits are supplied as an input for the subsequent XOR operation.

4. The processor device according to claim 3, wherein each T-box operation processes eight entry bits into 64 exit bits.

5. The processor device according to claim 1, wherein the implementation comprises in the round:

(i) an invertible mapping B occupied with random values, which is to be applied to left input values l of the round according to Bl, or two invertible mappings B and C occupied with random values, which are to be applied to left l and right input values r of the round according to Bl+Cr;

(ii) the left input values l of the round are replaced by Bl or Bl+Cr; and the combined key-dependent computation step T further comprises:

(iii) corresponding to (i) one or two inverse invertible mapping/s $B^{-1}$ or $B^{-1}$ and $C^{-1}$ occupied with random values, with which the invertible mapping/s B or B and C is/are undone.

6. The processor device according to claim 1, wherein the implementation additionally comprises a further invertible function g to be applied according to $g^{-1}(x)$ or $g^{-1}(x, y)$ to entry values x of the computation step S, or to entry values x of the computation step S and to the left entry values l or the right entry values r, or both the left entry values l and the right entry values r of the round supplied as obfuscation values y.

7. The processor device according to claim 6, wherein $g^{-1}(x)$ is equal to the inverse function of a function g(x) which has been applied to exit values of the preceding round which directly precedes the round.

8. A processor device comprising a memory having an executable implementation of a cryptographic algorithm DES comprising several rounds implemented thereon, wherein the implementation comprises in at least a round of the several rounds implemented thereon:

a reception of right input values r and left input values l of the round;

an expansion operation E arranged to expand at least some of the right input values r into expanded right input values r';

an implemented computation step S arranged to map the expanded right input values r' as computation step entry values x=r' onto exit values s=S[x], a XOR linkage operation at an exit of the round, arranged to link exit values s of the computation step S of the round with the left input values l of the round and to supply the linked exit values to the subsequent round;

wherein the computation step S is implemented as a key-dependent computation step which in addition to the computation step S further comprises a key linkage operation for linking input values of the round with key values of the round derived from the key;

wherein:

the computation step S is implemented as a combined key-dependent computation step T which further comprises:

a permutation operation P associated with the round, arranged to be applied to exit values s of the computation step S and to supply the exit values s of the computation step in permutated form to the XOR linkage operation at the exit of the round;

wherein the combined key-dependent computation step T further comprises:

an inverse expansion operation $E^{-1}$ associated with the round, arranged to be applied to at least some of the expanded right input values r' for undoing the expansion operation E and for supplying the non-expanded right entry values r as left entry values l for the subsequent round, wherein the mapping of the expanded right entry values r' by the computation step S within the round remains unaffected by the inverse expansion operation $E^{-1}$;

further comprising an implemented masking operation V arranged to mask exit values t of combined key-dependent computation steps T, which are dependent on the same right entry value r'i, are linked with masking values v(r'i) dependent on these right entry values r'i by means of the masking operation V, in particular are bit-wisely XORed according to t XOR v(r'i).

9. The processor device according to claim 1, wherein the combined key-dependent computation step T is masked, by means of an invertible function f, into a white-box-masked combined key-dependent computation step T', according to T'=f*T.

10. A processor device comprising a memory having an executable implementation of a cryptographic algorithm DES comprising several rounds implemented thereon, wherein the implementation comprises in at least a round of the several rounds implemented thereon:
  a reception of right input values r and left input values l of the round;
  an expansion operation E arranged to expand at least some of the right input values r into expanded right input values r';
  an implemented computation step S arranged to map the expanded right input values r' as computation step entry values x=r' onto exit values s=S[x];
  a XOR linkage operation at an exit of the round, arranged to link exit values s of the computation step S of the round with the left input values l of the round and to supply the linked exit values to the subsequent round;
  wherein the computation step S is implemented as a key-dependent computation step which in addition to the computation step S further comprises a key linkage operation for linking input values of the round with key values of the round derived from the key;
  wherein:
  the computation step S is implemented as a combined key-dependent computation step T which further comprises:
    a permutation operation P associated with the round, arranged to be applied to exit values s of the computation step S and to supply the exit values s of the computation step in permutated form to the XOR linkage operation at the exit of the round;
  wherein the combined key-dependent computation step T is masked, by means of an invertible function f, into a white-box-masked combined key-dependent computation step T', according to T'=f*T; and
  wherein the invertible function f comprises an affine mapping A applied to the computation step S, wherein the affine mapping A is arranged to generate exit values a from affine mapping A, by affine mapping A being applied to exit values s of the computation step S and, in addition, to the right input values r or the left input values l of the round supplied as obfuscation values y, so that it holds that exit values a=affine mapping A(S[x], y)=A(s, y), and wherein, altogether, by the invertible function f exit values w=f (s,y) are generated.

11. The processor device according to claim 1, wherein the combined key-dependent computation step T is masked in respectively 2, 4, 8 or 16 rounds with the same invertible function f into a white-box-masked combined key-dependent computation step T' in each round with a different invertible function f.

12. The processor device according to claim 1, wherein the processor device is equipped with a triple DES implementation which is composed of three of said implementations.

13. A processor device comprising a memory having an executable implementation of a cryptographic algorithm DES comprising several rounds implemented thereon, wherein the implementation comprises in at least a round of the several rounds implemented thereon:
  a reception of right input values r and left input values l of the round;
  an expansion operation E arranged to expand at least some of the right input values r into expanded right input values r',
  an implemented computation step S arranged to map the expanded right input values r' as computation step entry values x=r' onto exit values s=S[x],
  a XOR linkage operation at an exit of the round, arranged to link exit values s of the computation step S of the round with the left input values l of the round and to supply the linked exit values to the subsequent round;
  wherein the computation step S is implemented as a key-dependent computation step which in addition to the computation step S further comprises a key linkage operation for linking input values of the round with key values of the round derived from the key;
  wherein:
  the computation step S is implemented as a combined key-dependent computation step T which further comprises:
    a permutation operation P associated with the round, arranged to be applied to exit values s of the computation step S and to supply the exit values s of the computation step in permutated form to the XOR linkage operation at the exit of the round;
  wherein the processor device is equipped with a triple DES implementation which is composed of three of said implementations;
  wherein the combined key-dependent computation step T is masked, by means of an invertible function f, into a white-box-masked combined key-dependent computation step T', according to T'=f*T;
  wherein the white-box-masked with invertible functions f, such that for those of the three implementations of DES within the triple DES for which the same round keys are used the same white-box-masked combined key-dependent computation steps T' are used selectively for the first and the third DES.

14. A processor device comprising a memory having an executable implementation of a cryptographic algorithm DES comprising several rounds implemented thereon, wherein the implementation comprises in at least a round of the several rounds implemented thereon:
  a reception of right input values r and left input values l of the round;
  an expansion operation E arranged to expand at least some of the right input values r into expanded right input values r';
  an implemented computation step S arranged to map the expanded right input values r' as computation step entry values x=r' onto exit values s=S[x],
  a XOR linkage operation at an exit of the round, arranged to link exit values s of the computation step S of the round with the left input values l of the round and to supply the linked exit values to the subsequent round;
  wherein the computation step S is implemented as a key-dependent computation step which in addition to the computation step S further comprises a key linkage operation for linking input values of the round with key values of the round derived from the key;

wherein:
the computation step S is implemented as a combined key-dependent computation step T which further comprises:
a permutation operation P associated with the round, arranged to be applied to exit values s of the computation step S and to supply the exit values s of the computation step in permutated form to the XOR linkage operation at the exit of the round;
wherein the processor device is equipped with a triple DES implementation which is composed of three of said implementations;
wherein the combined key-dependent computation step T is masked, by means of an invertible function f, into a white-box-masked combined key-dependent computation step T', according to T'=f*T;
wherein the white-box-masked with invertible functions f, such that for those of the three implementations of DES within the triple DES for which the same round keys are used, the same functions f are used selectively for the first and the third DES.

15. The processor device according to claim 1, wherein the implementation comprises in each of a plurality of rounds with the exception of a first or last round of the algorithm configured partly in a deviating manner:
the reception of the right input values r and the left input values l of the round;
the expansion operation E arranged to expand at least some of the right input values r into expanded right input values r';
the implemented computation step S arranged to map the expanded right input values r' as the computation step entry values x=r' onto the exit values s=S[x];
the XOR linkage operation at an exit of the round, arranged to link exit values s of the computation step S of the round with the left input values l of the round and to supply the linked exit values to the subsequent round;

wherein the computation step S is implemented as a key-dependent computation step which in addition to the computation step S further comprises a key linkage operation for linking input values of the round with key values of the round derived from the key;
wherein:
the computation step S is implemented as a combined key-dependent computation step T which further comprises:
the permutation operation P associated with the round, arranged to be applied to exit values s of the computation step S and to supply the exit values s of the computation step in permutated form to the XOR linkage operation at the exit of the round.

16. The processor device according to claim 1, wherein the computation step S is implemented as the key-dependent computation step which in addition to the computation step S further comprises the key linkage operation for linking input values of the round with key values of the round derived directly from the key.

17. The processor device according to claim 1, wherein the computation step S is implemented as the key-dependent computation step which in addition to the computation step S further comprises the key linkage operation for linking input values of the round with key values of the round derived indirectly from the key.

18. The processor device according to claim 1, wherein the implemented masking operation V is arranged to mask the exit values t of the combined key-dependent computation steps T, which are bit-wisely XORed according to t XOR v(r'i).

19. The processor device according to claim 10, wherein the affine mapping A is a linear mapping.

20. The processor device according to claim 19, wherein the affine mapping A is a matrix MA.

* * * * *